United States Patent [19]
Marincic et al.

[11] Patent Number: 5,558,962
[45] Date of Patent: Sep. 24, 1996

[54] ALUMINUM CURRENT COLLECTOR FOR AN ELECTROCHEMICAL CELL HAVING A SOLID CATHODE

[75] Inventors: Nikola Marincic, Winchester; Luka Rabadjija, Newton, both of Mass.

[73] Assignee: Pacesetter, Inc., Sylmar, Calif.

[21] Appl. No.: 459,684

[22] Filed: Jun. 2, 1995

[51] Int. Cl.$^6$ ..................................................... H01M 4/64
[52] U.S. Cl. .................. 429/233; 429/235; 429/241; 429/242; 429/245; 429/94; 429/129; 429/122; 429/164; 429/165; 429/166; 429/212; 429/213
[58] Field of Search .................................... 429/233, 235, 429/241, 242, 245, 94, 129, 100, 122, 164, 165, 166, 185, 99, 149, 152, 153, 162, 212, 213

[56] References Cited

U.S. PATENT DOCUMENTS

| | | | |
|---|---|---|---|
| 4,502,903 | 3/1985 | Bruder | 429/162 |
| 4,565,751 | 1/1986 | Faust et al. | 429/94 |
| 5,114,811 | 5/1992 | Ebel et al. | 429/245 |

*Primary Examiner*—Bruce F. Bell
*Attorney, Agent, or Firm*—Harold C. Schloss

[57] ABSTRACT

The electrochemical cell includes an electrode structure having an aluminum current collector in combination with an active cathode material containing polycarbon monofluoride. The electrode structure also includes a polymeric separator and a lithium anode. The electrode structure is spiral wound and mounted within a cylindrical housing formed of conventional stainless steel. Care is taken to ensure that the aluminum foil isolates the polycarbon monoflouride of the cathode material from the stainless steel of the housing. The cylindrical housing is flooded with a non-aqueous electrolyte solution. The resulting cell is employed within an implantable medical device. In an alternative embodiment, electrode structures employing the aluminum current collector and the polycarbon monoflouride active cathode material are formed as rectangular plates and are mounted in parallel within a rectangular housing. In another alternative embodiment, the aluminum current collector is employed within a button cell.

12 Claims, 2 Drawing Sheets

ALUMINUM CURRENT COLLECTOR FOR AN ELECTROCHEMICAL CELL HAVING A SOLID CATHODE

BACKGROUND OF THE INVENTION

1. Field of the Invention

The invention generally relates to electrochemical cells for use in powering implantable devices and in particular to an improved current collector material for use within electrochemical cells having solid cathodes employing polycarbon monofluoride as an active cathode material.

2. Description of the Related Art

A wide range of electronic devices are designed for surgical implantation into humans or animals. One common example is the cardiac pacemaker. Other examples of implantable devices include devices for stimulating or sensing portions of the brain, spinal cord, muscles, bones, nerves, glands or other body organs or tissues.

Implantable devices are becoming more and more complex and commonly include sophisticated data processing hardware such as microprocessors, memory devices, or other large scale integration (LSI) devices. Often, the devices are designed for transmitting signals to remote sensing devices. With the increase in the sophistication of implantable devices and in particular with the need to reliably transmit signals to sensors external to the body, the need for improved power cells for powering the implantable devices has increased greatly. There are, of course, limitations on the design and configuration of power cells for use in implantable devices, especially with regard to the size and shape thereof. Moreover, the power cells for the implantable devices must be highly reliable and be capable of providing an adequate amount of current and voltage for an extended period of time.

One type of power supply for use in an implantable device is an electrochemical cell. Examples include cells employing lithium as an anode material and polycarbon monofluoride as an active cathode material. Typically, within such cells, a metal foil anode coated with lithium is provided in combination with polycarbon monofluoride formed on a current collector. A polymeric separator is positioned between the anode and the cathode thereby forming an electrode structure. The electrode structure is mounted within a cell housing which is flooded with a liquid non-aqueous electrolyte. Appropriate electrical contacts are provided to the anode and cathode.

Within electrochemical cells employing polycarbon monofluoride the choice of current collector material is particularly important. The current collector material must have electrical characteristics sufficient to achieve adequate current collection. The current collector material must also have certain mechanical characteristics to allow for proper formation of the electrochemical cell. For example, within button cells, such as those commonly employed within watches, the base portion of the button cell is typically employed as a current collector. Accordingly, the material chosen for the current collector must be sufficiently sturdy to resist bending or deformation which could damage the cell. Moreover, button and cylindrical cells include a crimped gasket around the perimeter of the cell. Hence, the current collector material must be sufficiently malleable to allow for formation of the gasket seal while also being sufficiently rigid to prevent subsequent damage to the seal which could result in either a loss of internal electrochemical cell materials or a short circuit between the collector base of the cell and the anode of the cell. The current collector material most commonly employed in button and cylindrical cells is "446-stainless steel", also known under the trade name Shomac.

Conventional stainless steel is not employed as a current collector in electrochemical cells having polycarbon monofluoride. Conventional stainless steel includes a considerable percentage of nickel. The polycarbon monofluoride reacts with the nickel causing an erosion of the stainless steel and a loss of active cathode material. 446-stainless steel, however, does not include any nickel but instead includes chromium and molybdenum and hence resists erosion. 446-stainless steel can be quite expensive and the need to employ 446-stainless steel within electrochemical cells therefore increases the overall cost of the cells. Accordingly, it would be desirable to provide an improved polycarbon monofluoride electrochemical cell which can employ conventional stainless steel rather than 446-stainless steel.

Another current collector material commonly employed is titanium. Titanium has good electrical characteristics for collecting current. However, titanium can be fairly expensive, thereby increasing the overall cost of the electrochemical cell. Moreover, titanium is not adequately annealable. Hence, for certain electrochemical cell configurations, titanium cannot easily be employed.

Accordingly, it would be desirable to provide an improved current collector material for use in electrochemical cells employing polycarbon monofluoride as an active cathode material. It is also a particular object of the invention to provide improved current collector materials for use within electrochemical cells of the type employed within implantable medical devices.

SUMMARY OF THE INVENTION

In accordance with one aspect of the invention an improved electrochemical cell is provided which includes polycarbon monofluoride in combination with a current collector formed of aluminum.

In an exemplary embodiment, the electrochemical cell is a cylindrical cell including a wound electrode structure having the polycarbon monofluoride coating a thin foil aluminum sheet. The electrode structure also includes a lithium anode separated from the polycarbon monofluoride by a polymeric separator. Alternatively, the anode may be formed of sodium, calcium or alloys thereof. The electrochemical cell also includes a non-aqueous electrolyte such as lithium perchlorate dissolved in propylene carbonate. In an alternative embodiment, the electrode structure employing the aluminum current collector with the polycarbon monofluoride active cathode material is configured as a rectangular plate and mounted within a rectangular housing along with other similar rectangular electrode plates.

In either embodiment, a conventional stainless steel housing may be employed. The aluminum foil is mounted between the stainless steel and the polycarbon monofluoride such that the polycarbon monofluoride does not contact the stainless steel. By ensuring that the polycarbon monofluoride does not contact the stainless steel, conventional stainless steel may be employed rather than 446-stainless steel. Hence, the overall cost of the electrochemical cell is greatly reduced. Moreover, by employing aluminum as a current collector, rather than titanium or other conventional polycarbon monofluoride cell current collectors, the electrode structure may be formed more easily, particularly because aluminum is more easily annealed than titanium.

Hence, the general objective in providing an improved electrochemical cell is achieved. Other objects and advantages of the invention will be apparent from the detailed description of the invention set forth below.

DESCRIPTION OF THE PREFERRED EMBODIMENTS

The invention relates to an improved current current collector material for use in an electrochemical cell for providing power within an implantable device. The invention will be described primarily with reference to a lithium battery cell but principles of the invention are applicable to other electrochemical cells as well.

Figure 1:
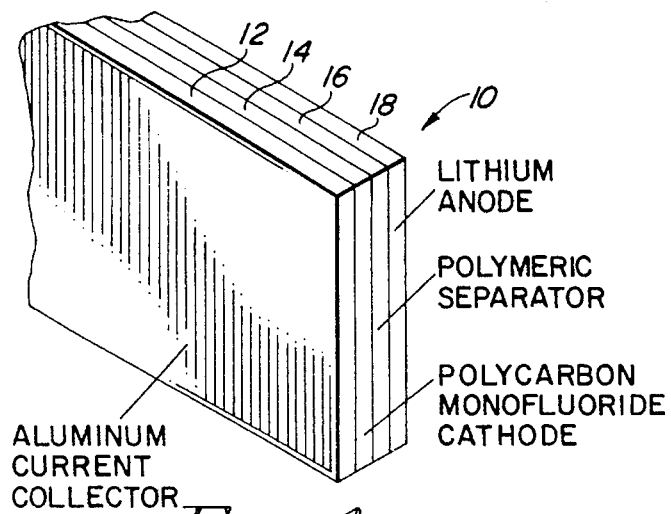
FIG. 1 is a perspective view of a portion of an electrode structure for use in an electrochemical cell with the electrode structure including a polycarbon monofluoride active carbon layer formed on a thin aluminum foil current collector.

FIG. 1 illustrates a portion of an electrode structure 10 configured in accordance with the invention. The electrode structure 10 includes a thin foil current collector 12 formed of aluminum, an active cathode layer formed of polycarbon monofluoride 14, a polymeric separator 16 and an anode 18. As can be seen from FIG. 1, the polymeric separator 16 separates the active cathode layer 14 from the anode 18. In exemplary embodiments, the anode 18 includes lithium coating a thin metal foil. The polymeric separator 16 may be a thin porous insulator with a high ion permeability such as polyolefin made into non-woven cloth or a microporous polypropylene.

The polycarbon monofluoride cathode layer 14 may be formed of a mixture of polycarbon monofluoride with actylene black and a binder such as polytetraflouroethylene (PTFE). The cathode material may be formed using conventional techniques such as by mixing the polycarbon monofluoride with carbon in a solution of isopropanol and water, mixed into a slurry, then heated to coagulate the PTFE and to precipitate out all solids.

The aluminum layer 12 is preferably formed to a thickness of 1 mil. Aluminum foil of such thickness is available commercially.

By employing aluminum as the current collector, rather than titanium or 446-stainless steel, the resulting electrode structure 10 can be more easily shaped into a desired configuration such as a wound configuration for use in cylindrical electrochemical cells. Moreover, desirable electrical characteristics of aluminum are advantageously employed. Aluminum has excellent stability in contact with the polycarbon monofluoride materials. Also, aluminum provides a highly conductive matrix which effectively reduces the internal impedance of the electrochemical cell. Such is particularly significant for cells configured for high power pulsing discharge. Furthermore, the use of aluminum as the current collector material reduces the overall cost of the electrochemical cell. Additionally, for electrode structures wound into a spiral configuration, the use of the relatively soft aluminum, rather than titanium or 446-stainless steel, allows the electrode structure to be bent more easily during manufacture resulting in fewer damaged electrode structures such structures having short circuits between the anode and the current collector. Accordingly, overall production costs of electrochemical cells are reduced by employing aluminum as the current collector. As will be described in more detail below, electrode structures having aluminum as the current collector may be advantageously employed within cylindrical cells, rectangular cells and button cells. The electrochemical cells described herein primarily employs a thin foil of aluminum as the current collector. However, expanded screen current collectors may also be formed of aluminum.

Figure 2:
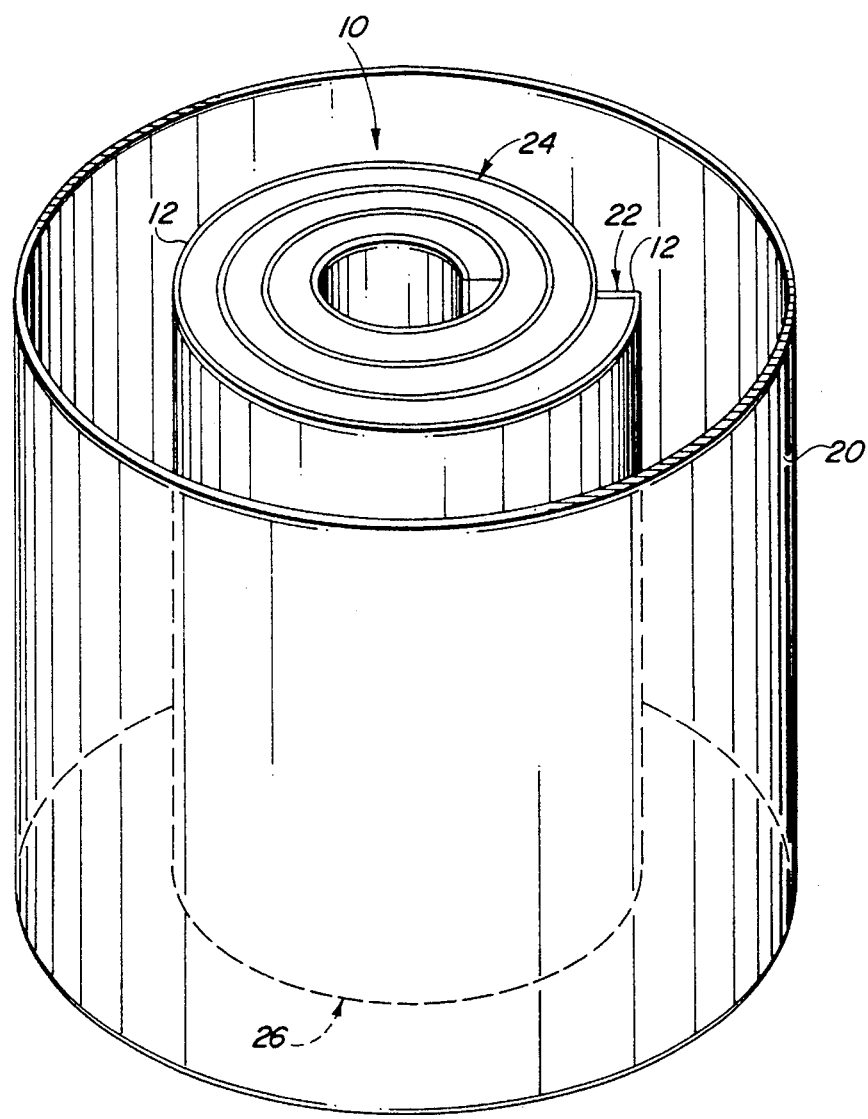
FIG. 2 is a perspective view of a cylindrical electrochemical cell having a wound electrode structure of the type illustrated in FIG. 1.

FIG. 2 illustrates the electrode structure 10 of FIG. 1 wound into a cylindrical configuration and mounted within a cylindrical housing 20 formed of stainless steel. Care is taken to ensure that none of the polycarbon monofluoride contacts the stainless steel of the housing 20. As such, a conventional stainless steel of the type employing a fairly large percentage of nickel may be used. Hence, although 446-stainless steel may alternatively be employed, such is not necessary so long as the aluminum is positioned between the housing 20 and the polycarbon monofluoride. In this regard, it may be desirable to enclose end portion 22 of the wound electrode structure with aluminum (as shown) and to further enclose top and bottom ends 24 and 26 of the cylindrical electrode structure as well (not shown). The polycarbon monofluoride cathode material is thereby adequately isolated from the stainless steel housing.

Although not shown, appropriate electrical contacts are provided to the anode and aluminum layers of the wound electrode structure. The electrical contacts are interconnected to terminals exterior to the housing which are in turn connected to electrical circuitry within an implantable medical device (not shown).

Prior to enclosing housing 20, the interior of the housing is filled with a non-aqueous electrolyte such as a mixture of dimethoxyethane (DME) and propylene carbonate. Other suitable electrolytes include $LiAsF_6$ in gamma-butyrolactone and lithium perchlorate dissolved in propylene carbonate.

A test cell was configured using a lithium perchlorate/propylene carbonate electrolyte. Superior voltage characteristics were observed in the cell despite the selection of the low conductivity lithium perchlorate electrolyte, thus demonstrating that a major part of the overall voltage drop occurs at the current collector/active material interface. As such, a more conductive electrolyte does not necessarily improve the internal impedance of the electrochemical cell. Rather, optimal contact characteristics between aluminum and the active cathode materials have a greater effect on the electrical performance.

Although conventional cathode materials employing polycarbon monofluoride may be employed, in a preferred embodiment the cathode material is formed in accordance with techniques described in co-pending U.S. patent application Ser. No. 08/459,685, filed Jun. 2, 1995, entitled "A Cathode Material for Use in an Electrochemical Cell and Method for Preparation Thereof," which is incorporated herein by reference. By forming the cathode in accordance with the method described therein, excellent contact is achieved between the aluminum and the polycarbon monofluoride.

Figure 3:
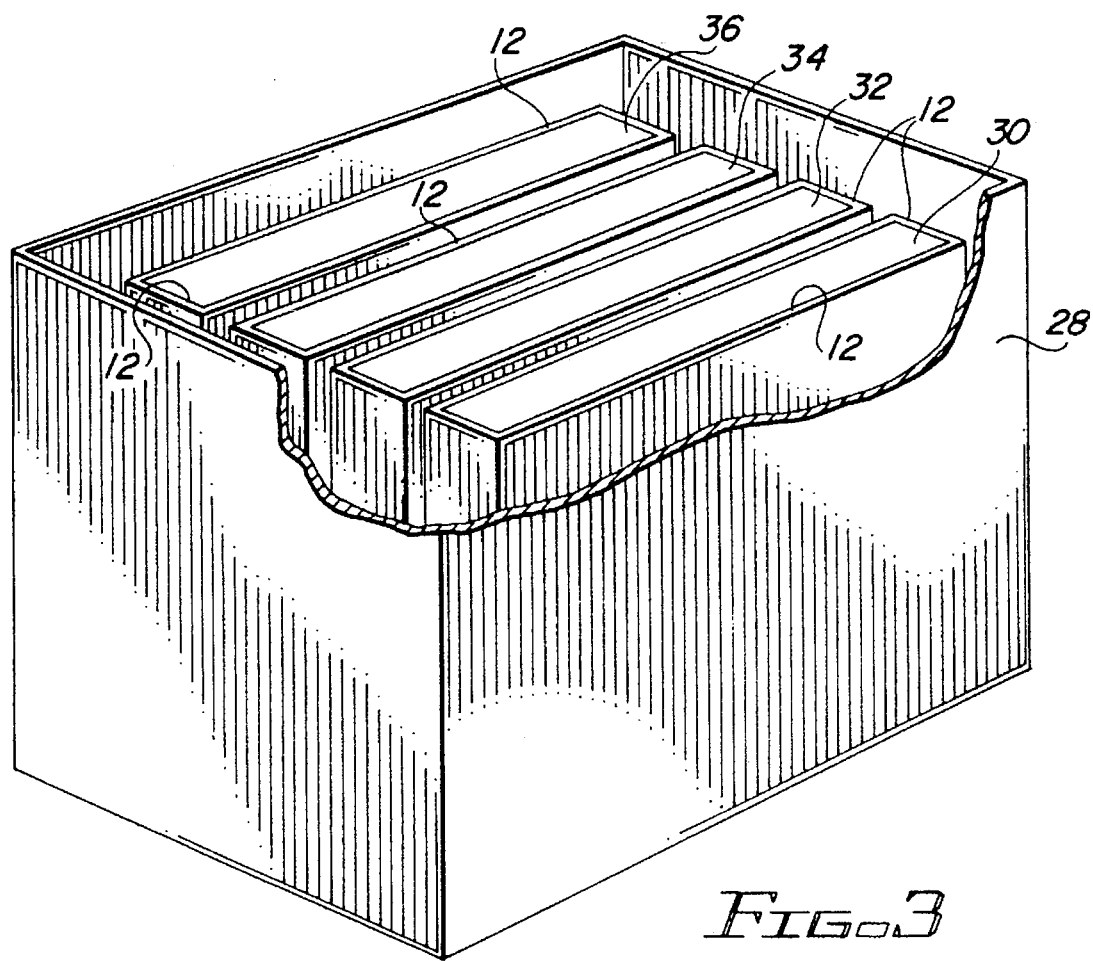
FIG. 3 is a perspective view of a rectangular electrochemical cell having parallel plate electrode structures of the type illustrated in FIG. 1.

FIG. 3 illustrates an alternative embodiment of the invention wherein electrode structures of the type illustrated in FIG. 1 are mounted as parallel plates within a rectangular housing 28. Within FIG. 3, exemplary electrode structures are denoted 30, 32, 34 and 36. As with the cylindrical cell of FIG. 2, the housing of the rectangular cell of FIG. 3 may be formed of conventional stainless steel with appropriate care taken to isolate the active cathode layers from the stainless steel housing. Appropriate electrical contacts are provided to each of the individual electrode plates. An electrolyte solution is poured into the housing and the housing is sealed. Alternatively, although not shown, a oval spiral-wound electrode structure may be employed within the rectangular housing. A method for forming such a oval spiral-wound structure is described in U.S. patent Ser. No. 08,459,682, filed Jun. 2, 1995, entitled "Electrode Structure for an Electrochemical Cell Having a Rectangular Housing," which is incorporated herein by reference.

Figure 4:
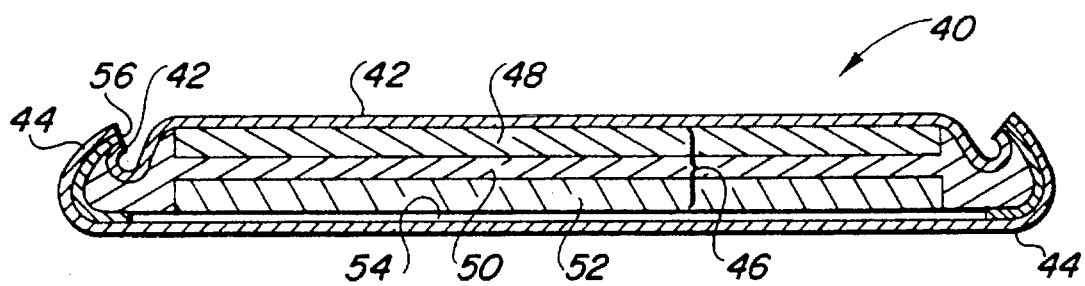
FIG. 4 is a side cross-sectional view of a button cell having a polycarbon monofluoride cathode and an aluminum current collector.

FIG. 4 illustrates another alternative embodiment of the invention wherein an electrode structure employing an aluminum current collector and a polycarbon monofluoride active cathode material is used within a button cell. More specifically, FIG. 4 illustrates a button cell 40 having an anode cap 42 and a base 44. An electrode structure 46 is mounted between the cap 42 and the base 44. The electrode structure 46 includes an anode 48 formed of, for example, lithium coated onto a metal foil. Immediately below the anode 48 is a separator material such as a polymeric separator 50. A layer of polycarbon monofluoride 52 and a layer of aluminum 54 are positioned between the separator 50 and the base 44. As can be seen, the aluminum layer 54 isolates the polycarbon monofluoride layer 52 from the collector base 44 thereby allowing the collector base 44 to be formed of conventional stainless steel, rather than 446-stainless steel.

To ensure electrical isolation between the anode cap 42 and the collector base 44, a gasket 56 is formed around the perimeter of the cell 40.

In each of the foregoing embodiments, a thin aluminum foil-type collector is employed. In alternative embodiments, an expanded screen current collector may be employed. Expanded screen current collectors often include sharp spikes formed along top and bottom edges thereof which can cause short circuits between the current collector and the anode of the electrode structure. The presence of such spikes may be eliminated by employing a fabrication method described in co-pending U.S. patent application Ser. No. 08/459,683, filed Jun. 2, 1995, entitled "Current Collector Having Coined Side Edges for Use in an Electrochemical Cell," which is incorporated herein by reference.

What has been described is an improved electrochemical cell for use with implantable devices wherein an aluminum foil current collector is employed in combination with a polycarbon monofluoride active cathode material. Although exemplary embodiments are described herein, such are only illustrative of principles of the invention which may be applied to other embodiments and for other applications as well. Accordingly, the exemplary embodiments described herein should not be taken as limiting the scope of the invention.

What is claimed is:

1. An electrochemical cell for use in an implantable device, the electrochemical cell comprising:

an electrode structure including:

a solid cathode employing polycarbon monofluoride formed on one side of a current collector formed of aluminum, an anode, and a separator between the anode and the cathode;

a housing surrounding the electrode structure; and a non-aqueous electrolyte filling a portion of the housing;

wherein the housing includes nickel and wherein the aluminum current collector of the electrode structure is interposed directly between the housing and the polycarbon monofluoride of the solid cathode.

2. The electrochemical cell of claim 1, the an anode of the electrode structure being selected from the group consisting of lithium, sodium, calcium, and alloys thereof.

3. The electrochemical cell of claim 1, wherein the housing is cylindrical and the electrode structure is wound in a spiral configuration.

4. The electrochemical cell of claim 1, wherein the non-aqueous electrolyte comprises lithium perchlorate dissolved in propylene carbonate.

5. The electrochemical cell of claim 1, wherein the housing is substantially rectangular and a plurality of the electrode structures are mounted in parallel within the housing.

6. The electrochemical cell of claim 1, wherein the cell is a button cell.

7. A method for fabricating an electrochemical cell, the method comprising the steps of:

forming a current collector of aluminum;

mounting polycarbon monofluoride to one side of the aluminum current collector thereby forming a cathode;

forming an anode and a separator;

mounting the anode and the cathode to opposing side surfaces of the separator thereby forming an electrode assembly;

mounting the electrode structure within a housing containing nickel with the aluminum current collector of the cathode directly interposed between the housing and the polycarbon monofluoride; and filling a portion of the housing with a non-aqueous electrolyte.

8. The method of claim 7, wherein the anode is formed of lithium, sodium, calcium, or alloys thereof.

9. The method of claim 7, wherein housing is cylindrical and the method further comprises the step of winding the electrode structure into a spiral configuration before mounting within the housing.

10. The method of claim 7, wherein the non-aqueous electrolyte comprises lithium perchlorate dissolved in propylene carbonate.

11. The method of claim 7, wherein the housing is substantially rectangular and the method further comprises the steps of forming a plurality of electrode structures and mounting the structures in parallel within the rectangular housing.

12. In an electrochemical cell having a cell housing for use in an implantable device wherein the electrochemical cell includes a solid active cathode material incorporating polycarbon monofluoride, an improvement comprising:

positioning an aluminum current collector directly between the solid active cathode material and the cell housing.

* * * * *